US005084970A

United States Patent [19]

Garanhel

[11] Patent Number: 5,084,970

[45] Date of Patent: Feb. 4, 1992

[54] TUBE CUTTER

[76] Inventor: Manuel A. Garanhel, 804 Jefferson Ave., Winnipeg, Manitoba, Canada, R2V 0P9

[21] Appl. No.: 608,364

[22] Filed: Nov. 2, 1990

[51] Int. Cl.[5] ...................... B23D 21/06; B26B 27/00; B26B 13/00; B26B 11/00

[52] U.S. Cl. .......................................... 30/92; 30/94; 30/241; 7/163

[58] Field of Search .................. 30/92, 93, 44, 96, 97, 30/98, 231, 232, 241; 7/163, 164

[56] References Cited

U.S. PATENT DOCUMENTS

| | | | |
|---|---|---|---|
| 786,646 | 4/1905 | Johnson | 7/163 |
| 2,566,434 | 9/1951 | Toth et al. | 30/94 |
| 2,869,413 | 1/1959 | Anderson . | |
| 3,013,335 | 12/1961 | Kowal | 30/94 |
| 3,636,629 | 1/1972 | Baun . | |
| 3,822,471 | 7/1974 | Crowl . | |
| 3,837,077 | 9/1974 | Filter | 30/241 |
| 3,854,205 | 12/1974 | Boskus . | |
| 4,103,419 | 8/1978 | Matthews et al. | 30/95 |
| 4,255,856 | 3/1981 | Mackie | 7/163 |
| 4,399,726 | 8/1983 | Zacuto . | |
| 4,739,554 | 4/1988 | Hytonen . | |
| 4,747,212 | 5/1988 | Cavdek | 30/92 |

*Primary Examiner*—Douglas D. Watts
*Assistant Examiner*—Paul M. Heyrana, Sr.
*Attorney, Agent, or Firm*—Adrian D. Battison; Stanley G. Ade; Murray E. Thrift

[57] ABSTRACT

A device for cutting flexible tubing includes a support member attached to a wall surface in fixed stationary position. The support member has a shelf projecting horizontally therefrom across which the tubing to be cut is laid. An adjustable end abutment member locates the end face of the tube as it lies across the shelf. A blade which has pointed end projects forwardly from the support member above the shelf and has a sharpened edge facing upwardly away from the shelf. In operation the user manually grasps the tubing on either side of the self and pushes the tubing rearwardly across the shelf toward the support member so that it engages the blade which punctures the tubing. With the tubing held in position against the shelf, an abutment surface on the support member and the end abutment member, the tubing is manually rotated to provide a cut lying exactly in a plane at right angles to the axis of the tubing.

9 Claims, 2 Drawing Sheets

TUBE CUTTER

FIELD OF THE INVENTION

The present invention relates to the field of hose or tubing cutting devices.

BACKGROUND OF THE INVENTION

Tube or hose cutting tools are well known devices. A number of devices have been described that cut hoses or tubing perpendicular to their axes at the point of cutting. The prior art Baum U.S. Pat. No. 3,636,629 discloses a manual hand held cutter, that moves about a tube or hose similar to a pipe cutter. In this device a pointed blade punctures the tubing at one point on its periphery and then a side cutting edge of the blade is rotated around the periphery of the tubing in a plane at right angles to the axis to complete a cutting action. However the design is very limited in relation to the sizes of tubing that can be accomodated and in addition there is a tendency for the device to twist as the cutting action takes place thus forming a helical cut line. Most other tube cutters describe a scissors type of action which is completely unacceptable for the very resilient tubing now available. Prior art devices in many instances are quite complicated structure and have no means thereon for both cutting and measuring of a tube. In most instances there is a device that must be held or moved in order to cut the tube.

SUMMARY OF THE INVENTION

The present invention describes a device that is simple in construction and easy to use. The device also provides a means thereon for the measuring of a tube to be cut, as well as allowing the operator to use both hands freely to accurately cut the tube, as the device is attached securely to a wall.

Is an object of the present invention to provide a tube cutting device that will cut through rubber, rubber-like material, plastics, and hoses such as hydraulic hoses, radiator hoses, polyvinylchloride or polyethelene hoses.

The present invention provides a device for the measuring and cutting of hoses or tubing comprising a device for the measuring and cutting of tubing comprising an elongate support member having a top end and a bottom end, means for attaching the device to a fixed so as to extend support substantially vertically thereon, an attached flange extending horizontally to form a planar horizontal guide surface extending from the support member, means for support of the flange on the support member, a blade, means for securely mounting the blade on the support member so as to project forwardly from the support member, the blade having a pointed end projecting away from the support member and a blade body, lying in a plane at right angles to the horizontal guide surface with one edge of the blade body being sharpened for a cutting action said mounting means for holding said blade being slideably mounted on said support means for movement therealong in a direction at right angles to the horizontal guide surface and adjustable means for measuring an end of the tubing, at a position spaced from the blade longitudinally of the tubing to determine a length of tubing to be cut.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 3:
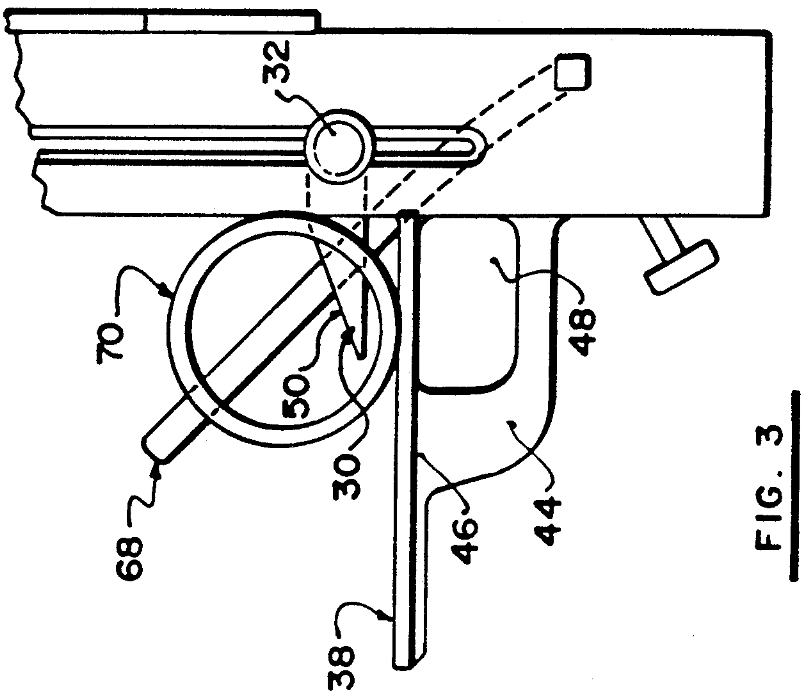
FIG. 3 is a side view of a part of the preferred embodiment in operation.
Figure 1:
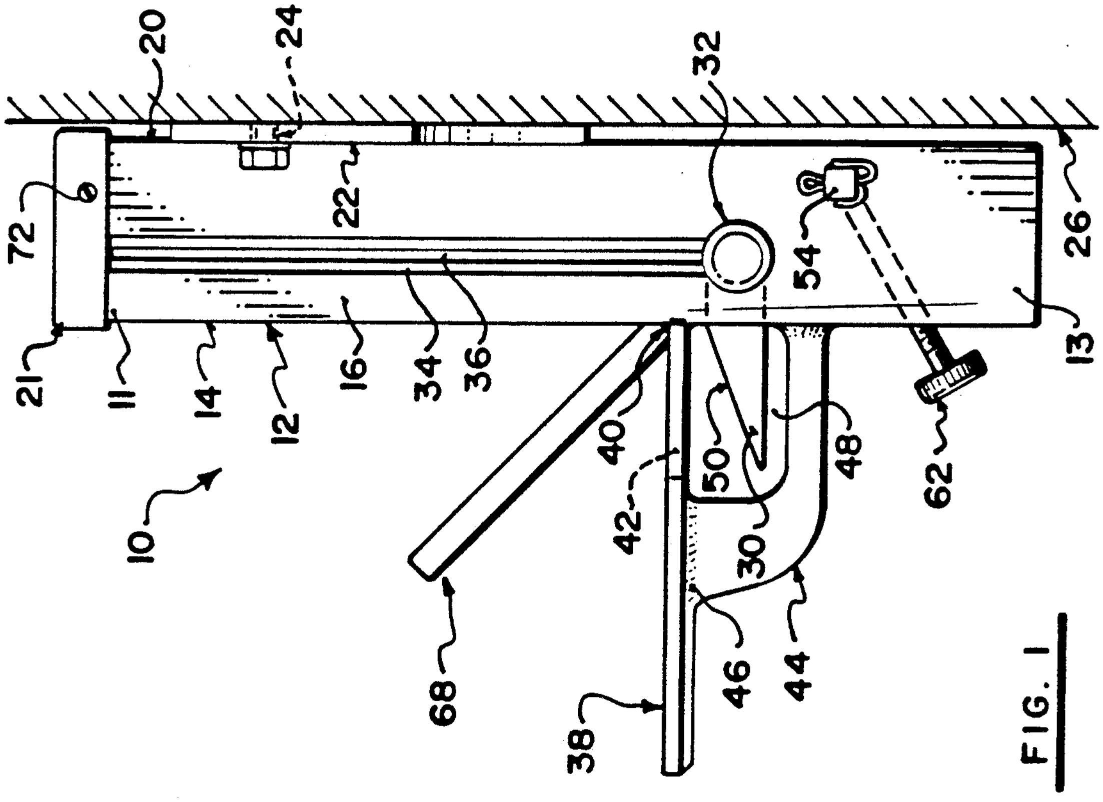
FIG. 1 is a side view of the preferred embodiment.
Figure 2:
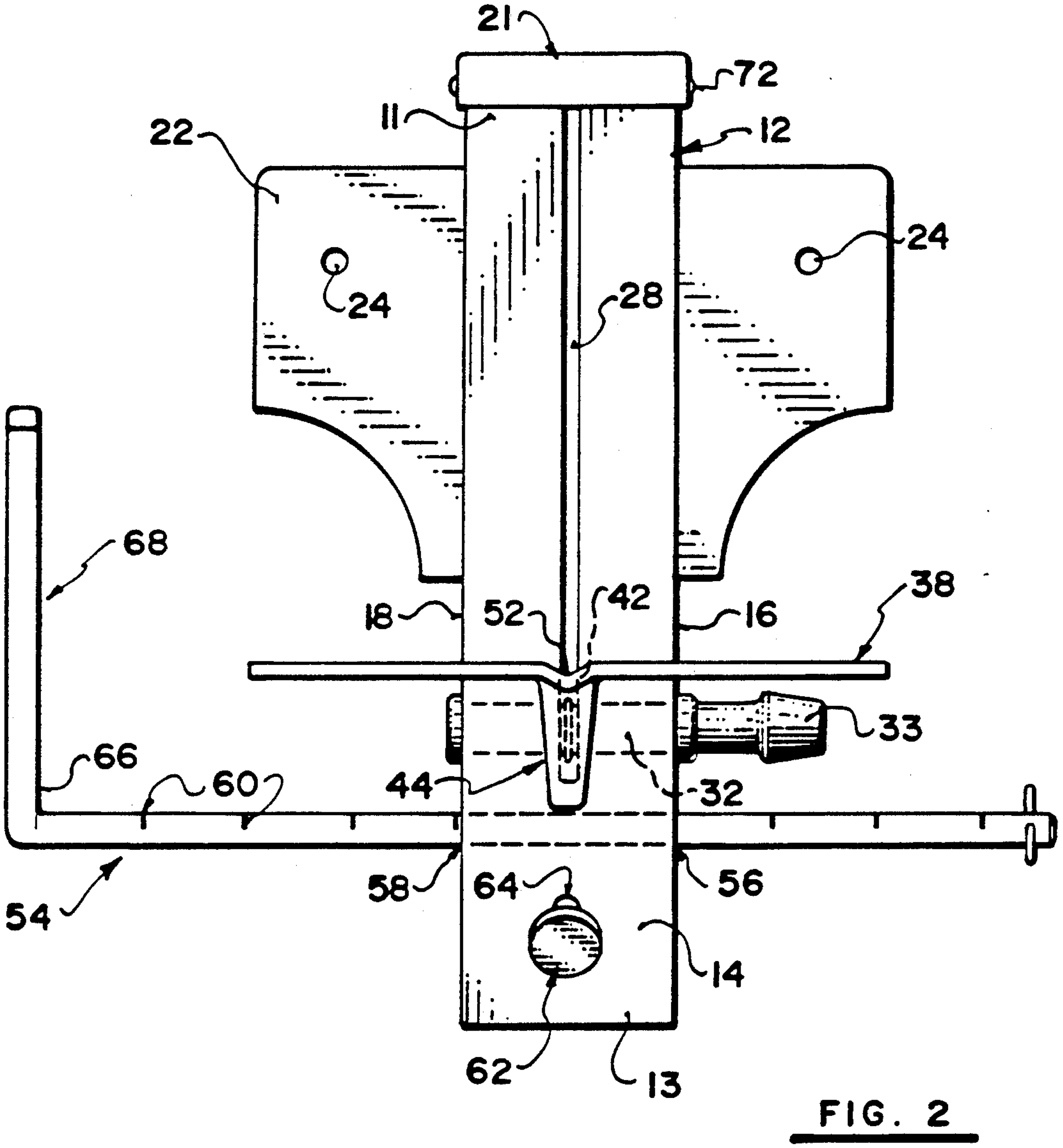
FIG. 2 is a front view of the preferred embodiment.

A tube cutting device as shown generally at 10. The device is comprised of a support member defined by a four-sided tube 12, with a top end 11 and a bottom end 13, a front wall 14, side walls 16 and 18, back wall 20, and a cap 21 covering the top end 11. The device has a bracket 22 integrally attached with the back wall 20 of the device. The bracket 22 extends outwardly from the back wall 20 of the device and has openings 24 therethrough, positioned adjacent each side wall of the tube 12, that allow for the attachment of the device to a wall 26.

On the front wall 14 of the tube 12 there is an elongate slot 28. There is mounted slideably within the slot 28 a blade 30 that protrudes from and moves up and down the slot 28. Each side wall 16 and 18 has a slot as well and the blade 30 is held in place in the slot 28 by a transverse blade holder 32. The blade holder 32 slides along the slots 34 and 36 that run vertically along the side walls 16 and 18 respectively. The slots 28, 34 and 36 extend from their openings at the top end of the tube 12 downward approximately ¾ of the way along the tube 12.

The blade holder 32 also has thereon a means for detachably fastening the blade holder along the slots 34 and 36 so that the blade 30 is positioned along the slots 28. In the embodiment described the blade holding means in the embodiment described is a screw-lock type that releasably attaches the blade holder along the slots 34 and 36. Slot 36 is narrower than the slot 34 as slot 34 has a screw 33 that detachably fastens to the edges of the slot 34.

There is attached to the outside of the front wall 14 a shelf or ledge 38, the surface of which is positioned perpendicular to the front wall and integrally attached at its edge 40 to the front wall 14. The ledge extends outwardly from the front wall 14 from the point of attachment 40.

On the surface of ledge 38 is a slotted opening 42 perpendicular to the plane of the front wall 14 and aligned with the slot 28 on the front wall 14. The opening 42 is of sufficient size to allow the passage therethrough of the mounted blade 30.

Below the ledge 38 is a support 44, integrally attached to the bottom surface of the ledge 38 at 46 and the front wall 14, providing an opening therethrough 48 positioned near the base of the slot 28. The blade 30, when positioned at the bottom of the slot 28, below the plane of the ledge 38, is in a storage position within the opening 48.

The blade 30 is positioned in the holder so that the pointed end extends outwardly from the slot 28 and has its sharp edge 50 directed upwardly.

There is on the ledge 38, extending from the edge of the slot 42, an indentation 52. The indentation 52 is of the same approximate width as the slot 42 on the ledge 38. This indentation 52 extends from the end of the slot 42 along the surface to the edge of the ledge 38, on a perpendicular line from the front wall 14 at the points of attachment 40.

There is a transverse rod 54 extending through openings 56 and 58 on the lower part of side walls 16 and 18 respectively. On the rod 54 are markings 60 that allow for measurement of an object along the rod. The rod 54 is four-sided, as are the openings 56 and 58, and the rod slideably fits through these openings. The configuration and fit of the rod 54 within the openings 56 and 58 does not allow for a rotation of the rod 54 within the openings 56 and 58.

The rod 54 is held in place by a screw 62 through an opening 64 on the front wall 14 below the blade slot 28. The screw 62 releasably abuts the rod 54 within the tube 12 and holds the rod 54 in place when it is tightened. The measurements on the rod allow for the measurement of a tube or hose that is to be cut.

The rod 54 has integrally attached at its end 66 a member 68 extending upwardly and outwardly therefrom, towards the plane of the ledge 38. The end of the member 68 is positioned at a point just above the plane of the ledge 38, so that a tube resting on a ledge 38, and extending horizontally beyond the ledge 38, abuts the edge of the member 68. Measurements from the end point 66 to the blade 30 may be performed by way the markings 60 on the rod 54.

In operation, the hose 70 is placed on the upper surface of the ledge 38, with the end of the tube aligned with the rod end member 66. The rod 54 is adjusted by sliding it through the openings 56 and 58 on the tube 12 and locking the rod 54 in place by tightening of the screw 62 against the rod 54.

The blade holder 32 is loosened and the mounted blade 30 is raised along the slot 28 to a position above the ledge 38 where it is fastened into place by the tightening of the blade holder 32.

With the blade 30 secured in place along the slot 28, above the ledge 38, the length of tube is placed on the surface of the ledge 38, with its end touching the end member 66 as previously determined.

The tube is grasped with both hands, one hand on each side of the tube 12. The tube is pushed manually across the ledge 38 onto the blade 30, so that the point of the blade pierces the tube 70. With the circumferencial edge of the tube 70 against the front wall 14 and the ledge 38, the tube 70 is manually rotated in a clockwise direction as shown in FIG. 3 so that the sharp edge 50 of the blade 30 slices through the tube 70, thereby cutting the tube at an angle perpendicular to the axis of the tube 70.

When not in operation, the blade 30 is locked into position at the bottom of the slot 28, below the plane of the ledge 38 and within the opening 48.

When changing the blade, the cap 21 is removed and the blade and transverse holder slide upward and out of the top of the tube, as the slots 28, 34 and 36 all extend to the top of the tube 12. The blade 30 is replaced within the holder 32 and put back into the device with its sharp side up. The cap 21 is replaced. In the described embodiment, the cap 21 is held in place by screws 72 that must be removed before the cap 21 can be taken off.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A method of cutting from a piece of tubing a portion of a predetermined length comprising mounting a support member on a fixed support so that the support member is held stationary, providing a first and a second abutment surface on the support member arranged such that in a cross section taken in a vertical plane the surfaces converge toward an apex and such that the piece can be moved to a location where the piece is contacted in said vertical plane at one point only be said first surface and at one point only by said second surface, providing a width of the first and second surfaces transversely of the vertical plane sufficient to hold a longitudinal axis of the tubing against twisting relative to the surfaces during cutting, providing a planar blade member projecting outwardly from said first surface in said vertical plane, said blade member having a pointed end thereof facing away from said first surface and a sharpened side edge thereof extending from the pointed end toward the first surface and facing away from the second surface, providing an end abutment member, moving the end abutment member to a position to locate one end face of the piece of tubing at a predetermined distance from the blade member, contacting the piece one the end abutment member, manually moving the piece in a direction transverse to the axis thereof toward the apex so that the pointed end punctures the tubing, and manually rotating the piece relative to the first and second surfaces about the axis of the piece while in contact with the first and second surfaces and the end abutment member to cause the sharpened side edge to cut the portion at said predetermined distance from the end face.

2. A method of cutting from a piece of tubing a portion of a predetermined length comprising mounting a support member on a fixed support so that the support member is held stationary, providing a first and a second abutment surface on the support member, the second abutment surface comprising a substantially planar shelf, providing a planar blade member lying in a plane substantially at right angles to the said planar shelf, said blade member having a pointed end thereof and a sharpened side edge thereof extending from the pointed end and facing away from the planar shelf, providing an end abutment member, moving the end abutment member to a position to locate one end face of the piece of tubing at a predetermined distance from the blade member, contacting the piece on the end abutment member and on the planar shelf, manually moving the piece in a direction transverse to the longitudinal axis thereof, across the planar shelf toward the first abutment surface so that the pointed end of the blade member punctures the tubing and manually rotating the piece relative to the planar shelf about the longitudinal axis of the piece while in contact with the planar shelf and the end abutment member to cause the sharpened side surface to cut the portion at said predetermined distance from the end face.

3. A device for cutting from a piece of tubing a portion of a predetermined length comprising a support member, means on the support member for attachment to the support member to a fixed support to hold the support member stationary, means on the support member defining a first abutment surface, a substantially planar shelf mounted on the support member at an angle to the first abutment surface so that the piece of tubing can be laid across the planar shelf with one side of the piece of tubing in contact with the first abutment surface, a planar blade member lying in a plane substantially at right angles to the planar shelf, the blade member having a pointed end thereof facing away from said first abutment surface and a sharpened side edge extending from the pointed end toward the first abutment surface and facing away from the planar shelf, and an end abutment member mounted on the support member for adjusting movement relative thereto and arranged for engagement with an end face of the piece of tubing.

4. A device according to claim 3 wherein said planar shelf has therein a slot extending from the first abutment surface, the blade member being shaped so as to pass through the slot to a position on an underside of the planar shelf for storage.

5. A device according to claim 3 including means mounting the planar blade member for movement longitudinally of the support member in a direction at right angles to said planar shelf so as to adjust the distance of the sharpened side edge from the planar shelf.

6. A device according to claim 3 wherein said end abutment member comprises a transverse rod extending through the support member and slidable longitudinally of the rod, the rod having integrally attached to an end thereof a guide member projecting to one side thereof to a position for engagement of an end face of the piece of tubing on the planar shelf and means to locate the rod at a selected longitudinal position thereof.

7. A device according to claim 6 in which the transverse rod has a flat side thereof with measurement markings thereon.

8. A device according to claim 3 in which the means for attaching the support member to a fixed support comprises a bracket integrally attached to a back wall of the support member, said bracket having an opening therein to allow for screw fastening of the bracket to the fixed support.

9. A device according to claim 3 in which the planar shelf includes a support portion arranged underneath the planar shelf, said support portion extending from the planar shelf to the support member and defining underneath the planar shelf a receptacle, said receptacle being of a sufficient size to receive and contain the blade member therein for safety storage.

* * * * *